US008011586B2

(12) United States Patent
Sato

(10) Patent No.: US 8,011,586 B2
(45) Date of Patent: Sep. 6, 2011

(54) APPARATUS, METHOD, PROGRAM, AND STORAGE MEDIUM

(75) Inventor: Hirochika Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 12/498,416

(22) Filed: Jul. 7, 2009

(65) Prior Publication Data

US 2010/0012729 A1    Jan. 21, 2010

(30) Foreign Application Priority Data

Jul. 16, 2008   (JP) .................. 2008-185112

(51) Int. Cl.
*G06K 7/10*   (2006.01)
*G06K 9/18*   (2006.01)

(52) U.S. Cl. ......... 235/462.09; 235/462.01; 235/462.08; 235/462.1; 235/462.11; 235/487

(58) Field of Classification Search ............. 235/462.01, 235/462.08, 462.09, 462.1, 462.11, 487
See application file for complete search history.

(56) References Cited

U.S. PATENT DOCUMENTS

| 5,523,552 | A | * | 6/1996 | Shellhammer et al. .. 235/462.09 |
| 6,181,818 | B1 | | 1/2001 | Sato et al. .................... 382/170 |
| 6,246,804 | B1 | | 6/2001 | Sato et al. .................... 382/284 |
| 2004/0108381 | A1 | | 6/2004 | Elliott et al. ............. 235/462.01 |
| 2005/0023355 | A1 | | 2/2005 | Barrus ..................... 235/462.15 |
| 2006/0077211 | A1 | * | 4/2006 | Zhou ............................. 345/650 |
| 2007/0198180 | A1 | * | 8/2007 | Sakamoto .................... 701/211 |

FOREIGN PATENT DOCUMENTS

| EP | 1 808 799 A1 | 7/2007 |
| JP | 2006-203667 | 8/2006 |

* cited by examiner

*Primary Examiner* — Daniel Hess
*Assistant Examiner* — Ali Sharifzada
(74) *Attorney, Agent, or Firm* — Fitzpatrick, Cella, Harper & Scinto

(57) ABSTRACT

An object of the present invention is to reduce a processing time and make a printed image look better in appearance in processing of printing a two-dimensional code again. In order to achieve the above-described object, an apparatus according to the present invention includes decoding unit for decoding a non-upright two-dimensional code in a manuscript image, and synthesis unit for creating a two-dimensional code by using information obtained by the decoding, to synthesize the two-dimensional code in an upright state onto the manuscript image.

13 Claims, 17 Drawing Sheets

US 8,011,586 B2

APPARATUS, METHOD, PROGRAM, AND STORAGE MEDIUM

BACKGROUND OF THE INVENTION

1. Field of the Invention

The present invention relates to an apparatus, a method, a program, and a storage medium which are capable of handling a two-dimensional code.

2. Description of the Related Art

Conventionally, there is an image forming apparatus that encodes specific information into a two-dimensional code typified by a QR code (registered trademark), to print the two-dimensional code onto a sheet. In such an image forming apparatus, it is possible to read a manuscript on which a two-dimensional code is printed, with a scanner of the image forming apparatus, and to decode the two-dimensional code to extract the information thereof.

Moreover, it is possible to change the information obtained by the extraction into a two-dimensional code again, and to print the two-dimensional code on a sheet again. With respect to a printing position at the time of printing it again, it has been known that the two-dimensional code is printed at a same position (coordinates and angle) as the two-dimensional code in the manuscript in a conventional art.

For example, in a case in which an image in the manuscript read with a scanner is an image as shown in FIG. 5, and a two-dimensional code 501 in the image is rotated, when the image is reproduced with use of the conventional art, an image as shown in FIG. 5 is obtained on the copy as well. In this case, the two-dimensional code 501 is rotated as is as shown in FIG. 5 on the copy as well.

For example, in the technique in Japanese Patent Laid-Open No. 2006-203667, when a two-dimensional code in a manuscript is detected, a rotation angle of the two-dimensional code is stored in a storage device. Then, when the two-dimensional code is printed again, the two-dimensional code is rotated by the rotation angle stored in the storage device at the time of detecting the two-dimensional code, and can be printed on the same coordinates as the two-dimensional code in the manuscript. If a two-dimensional code is rotated to be printed again, there is an advantageous effect that a sheet on which the two-dimensional code is printed looks better in appearance because the two-dimensional code to be printed again can be overlapped on a two-dimensional code in a manuscript.

However, if a two-dimensional code to be printed again is rotated, rotation processing of a two-dimensional code requires time, and time to print the two-dimensional code is increased.

SUMMARY OF THE INVENTION

An apparatus according to the claim 1 on filing includes decoding unit operable to decode a non-upright two-dimensional code in a manuscript image, and synthesis unit operable to create a two-dimensional code by using information obtained by the decoding, to synthesize the two-dimensional code in an upright state onto the manuscript image.

Further features of the present invention will become apparent from the following description of exemplary embodiments (with reference to the attached drawings).

DESCRIPTION OF THE EMBODIMENTS

Hereinafter, best modes for carrying out the present invention will be described with reference to the drawings.

First Embodiment

Figure 1:
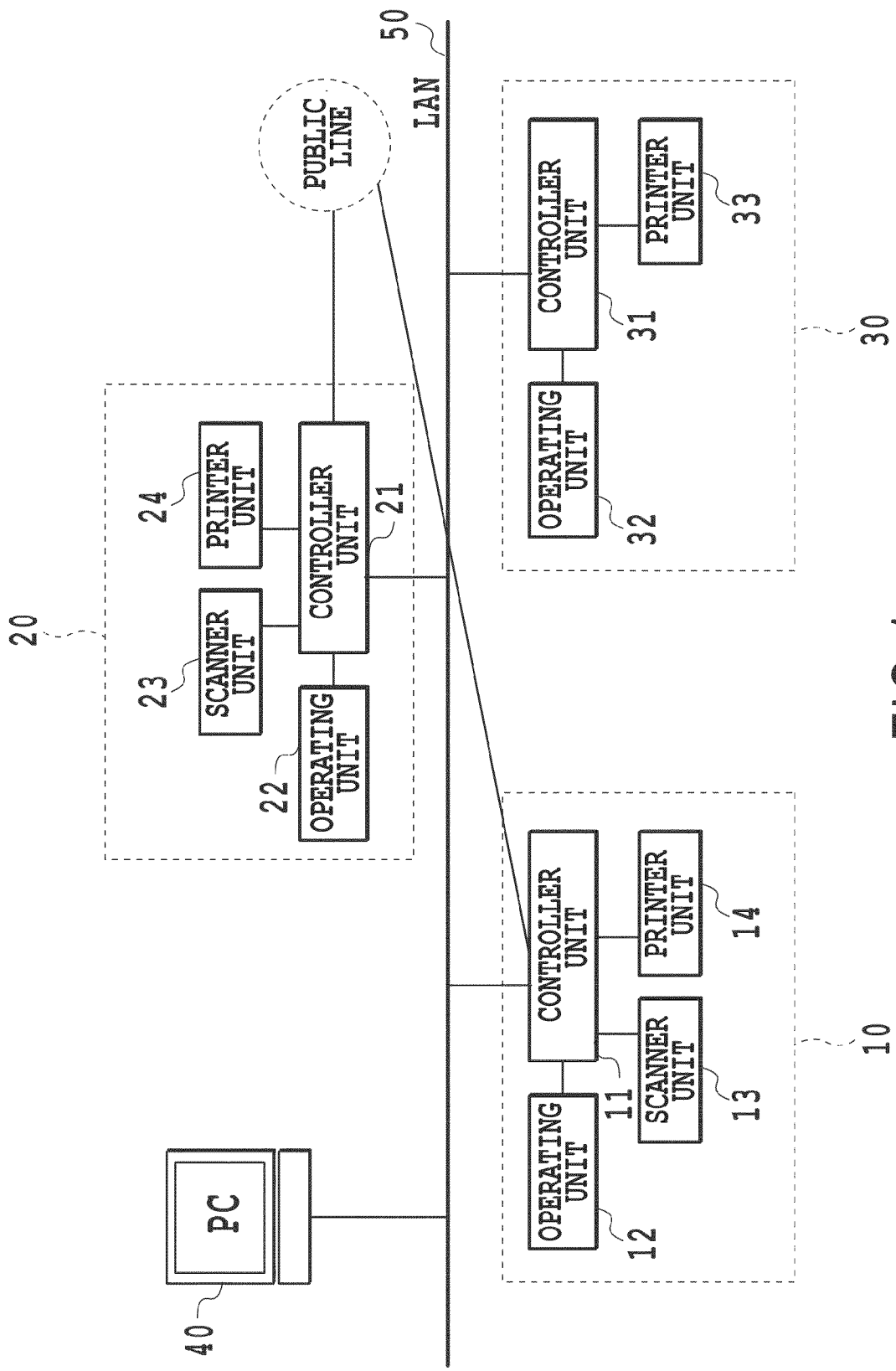
FIG. 1 is a block diagram showing one example of a system according to an embodiment of the present invention.

FIG. 1 is a block diagram showing one example of a system according to an embodiment of the present invention. In the system of FIG. 1, a host computer (hereinafter called PC) 40 and three image forming apparatuses 10, 20, and 30 are connected to a LAN 50.

In the system according to the embodiment of the present invention, the numbers of PCs and image forming apparatuses which are connected to the LAN 50 are not limited to the numbers shown in FIG. 1. Further, in the present embodiment, the LAN is used as a connection method. However, the connection method is not limited to a LAN. For example, in the present embodiment, a given network such as a WAN (public line), a serial transmission system such as a USB, or a parallel transmission system such as a Centronics interface and SCSI may be used as a connection method.

The PC 40 has functions as a personal computer. The PC 40 is capable of sending/receiving files or sending/receiving e-mails by use of FTP and/or SMB protocols via the LAN 50 or a WAN. Further, the PC 40 is capable of issuing a print command via a printer driver to the image forming apparatuses 10, 20, and 30.

The image forming apparatus 10 and the image forming apparatus 20 are apparatuses having the same configuration. The image forming apparatus 30 is an image forming apparatus having only a print function, and does not have a scanner unit that is provided to the image forming apparatuses 10 and 20. Hereinafter, for ease of explanation, the image forming apparatus 10 between the image forming apparatuses 10 and 20 is focused on, to describe the configuration in detail.

The image forming apparatus 10 has a scanner unit 13 serving as an image input device, a printer unit 14 serving as an image output device, a controller unit 11 that manages operation control of the entire image forming apparatus 10, and an operating unit 12 serving as a user interface (UI).

The image forming apparatus 20 has a scanner unit 23 serving as an image input device, a printer unit 24 serving as an image output device, a controller unit 21 that manages operation control of the entire image forming apparatus 20, and an operating unit 22 serving as a user interface (UI).

The image forming apparatus 30 has a printer unit 33 serving as an image output device, a controller unit 31 that manages operation control of the entire image forming apparatus 30, and an operating unit 32 serving as a user interface (UI).

Figure 2:
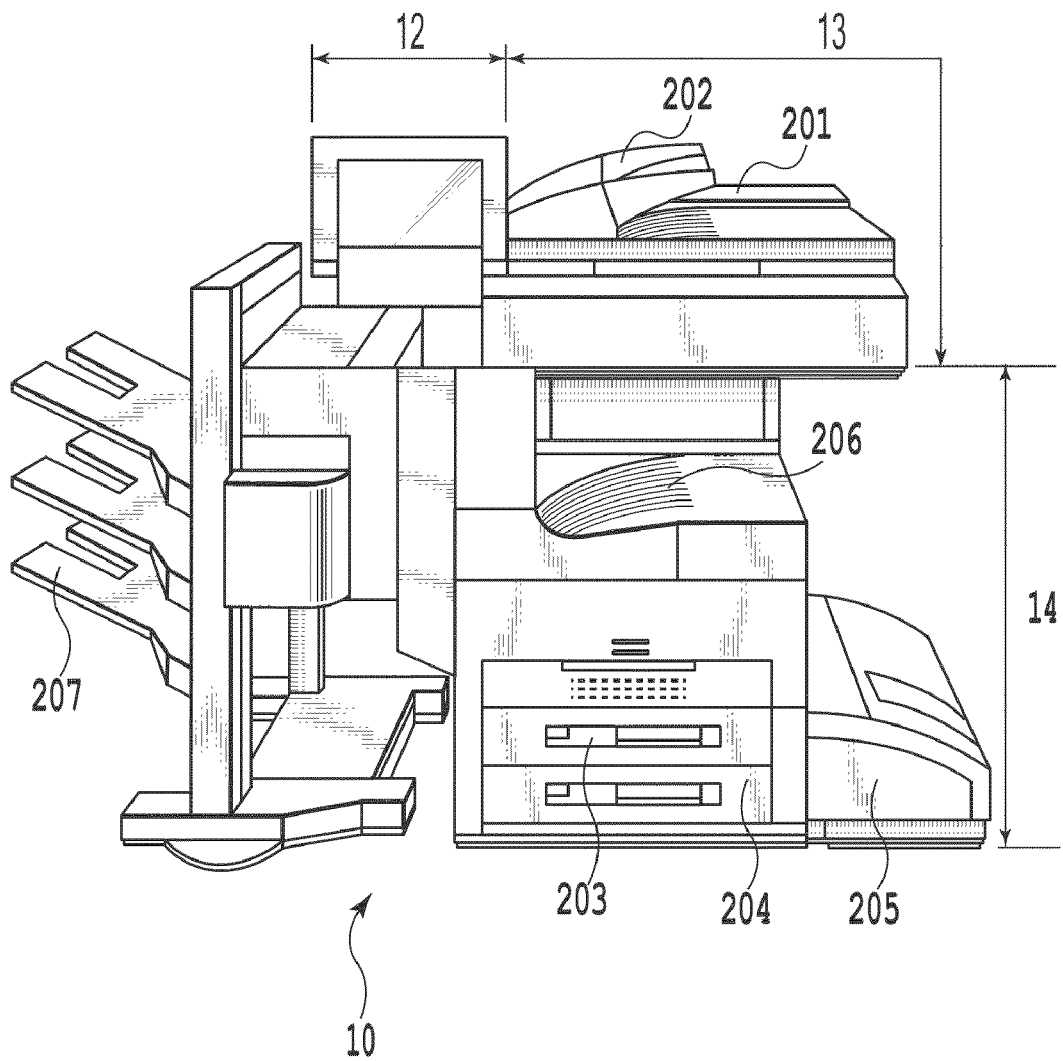
FIG. 2 is a diagram showing an appearance of an image forming apparatus.

FIG. 2 is a diagram showing an appearance of the image forming apparatus 10. The scanner unit 13 inputs a reflected light obtained by exposing and scanning an image on a manuscript into a CCD, to convert information on the image into electrical signals. The scanner unit 13 further converts the electrical signals into luminance signals composed of the respective colors of R, G, and B, and outputs the luminance signals as image data to the controller unit 11.

Note that manuscripts are set in a tray 202 of a document feeder 201. When a user issues an instruction to start reading from the operating unit 12, an instruction to read a manuscript is given from the controller unit 11 to the scanner unit 13. When the scanner unit 13 receives the instruction from the controller unit 11, the scanner unit 13 feeds the manuscripts one by one from the tray 202 of the document feeder 201, to perform an operation to read a manuscript. Note that a method for reading a manuscript may not be an automatic feeding system by the document feeder 201, but a method in which a manuscript is placed on a glass surface (not shown) and an exposure unit is moved to scan the manuscript.

The printer unit 14 is an image forming device that forms image data received from the controller unit 11 as an image on a sheet. In the present embodiment, the image forming system is an electrophotographic system using a photoconductor drum and a photoconductor belt. However, an image forming system is not necessarily limited to the system in the present invention. For example, an ink-jet system that discharges inks from a minute nozzle array to perform printing on a sheet may be applied to the present invention. Further, a plurality of sheet cassettes 203, 204, and 205, which are capable of selecting different sheet sizes and sheet directions are provided to the printer unit 14. Printed sheets onto which post processing is not executed are discharged to a sheet receiving tray 206. Printed sheets onto which post processing is executed are discharged to a post processing unit 207. As post processing, stapling, punching, or cutting are carried out with respect to the discharged sheets.

Figure 3:
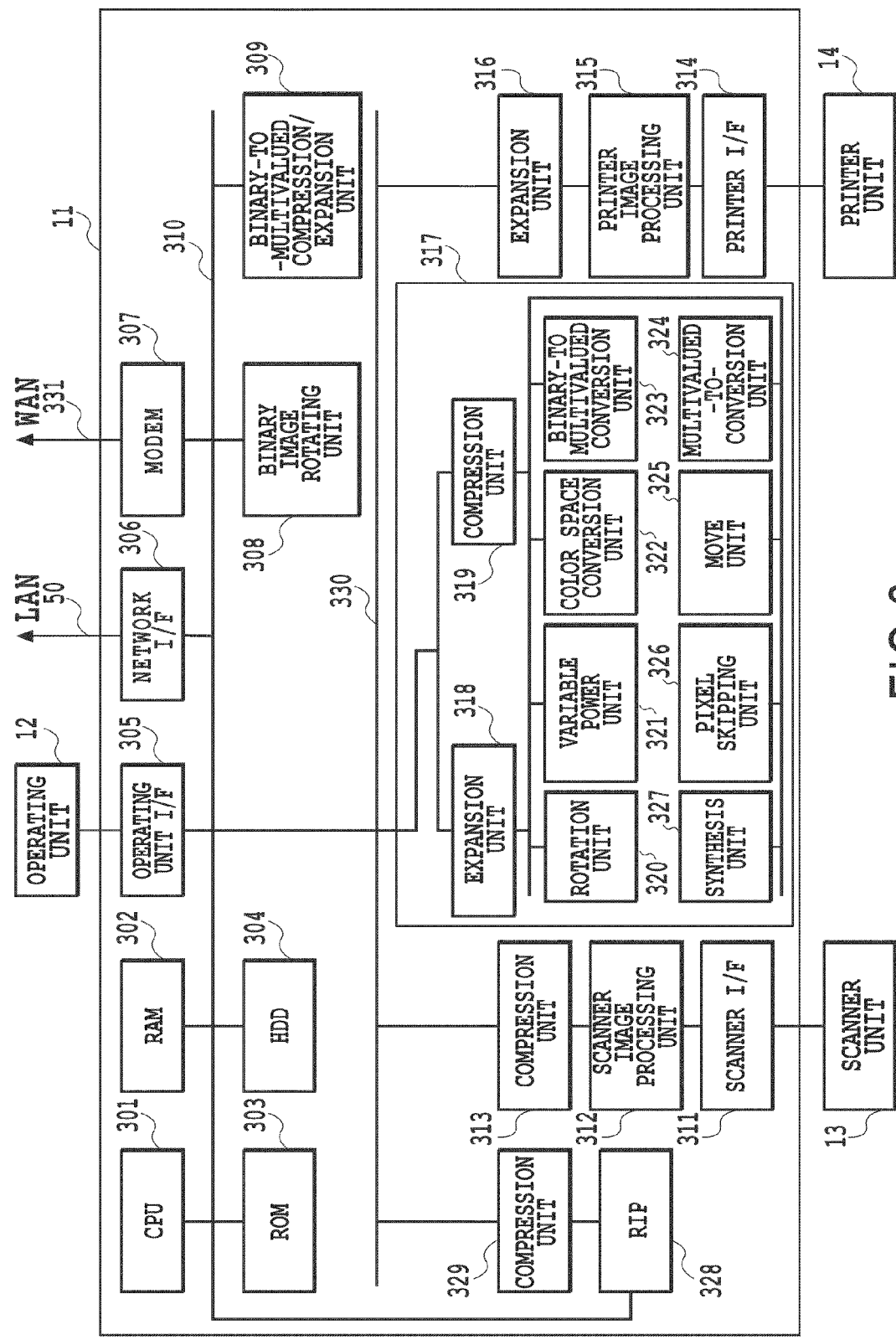
FIG. 3 is a block diagram showing a controller unit of the image forming apparatus.

FIG. 3 is a block diagram for a more detailed explanation of the controller unit 11 of the image forming apparatus 10.

The controller unit 11 is electrically connected to the scanner unit 13 and the printer unit 14, and on the other side, the controller unit 11 is connected to an external device such as the PC 40 via the LAN 50 or a WAN 331. Thereby, it is possible to input and output image data or device information to and from the controller unit 11.

A CPU 301 controls accesses to a connecting device overall on the basis of a control program stored in a ROM 303, and controls various types of processings executed inside the controller unit 11 overall.

A RAM 302 is a system work memory in which the CPU 301 operates, and a memory for temporarily storing image data. The RAM 302 is composed of an SRAM for retaining stored content even after power-off, and a DRAM from which stored content is erased after power-off. A boot program for the apparatus is stored in the RAM 303. An HDD 304 is a hard disk drive, and is capable of storing system software and image data therein.

An operating unit I/F 305 is an interface unit for connecting a system bus 310 and the operating unit 12. The operating unit I/F 305 receives image data to be displayed on the operating unit 12 from the system bus 310, to output the image data to the operating unit 12, and outputs information input from the operating unit 12 to the system bus 310.

A network I/F 306 is connected to the LAN 50 and the system bus 310, to input and output information. A modem 307 is connected to the WAN 331 and the system bus 310, to input and output information. A binary image rotating unit 308 turns the direction of image data before transmitting the data. A binary and multivalued compression/expansion unit 309 converts resolution of image data before transmitting the data into a predetermined resolution or a resolution corresponding to the capacity of the other side. Note that a system such as JBIG, MMR, MR, or MH is used for compression and expansion. An image bus 330 is a transmission channel for exchanging image data, and is composed of a PCI bus or IEEE 1394.

A scanner image processing unit 312 performs corrections, processes, and edits onto image data received from the scanner unit 13 via a scanner I/F 311. Note that, the scanner image processing unit 312 judges whether the received image data is a color manuscript or a black and white manuscript, and a text manuscript or a photographic manuscript. Then, the scanner image processing unit 312 attaches a judged result to the image data. Such attached information is called attribute data.

A compression unit 313 receives the image data to compress the image data. An expansion unit 316 expands the image data, and thereafter, the expansion unit 316 rasterextracts the expanded image data, to transmit it to a printer image processing unit 315.

A printer image processing unit 315 receives the image data transmitted from the expansion unit 316, and executes image processing onto the image data with reference to the attribute data attached to the image data. The image data after the image processing is output to the printer unit 14 via the printer I/F 314.

An image conversion unit 317 executes predetermined conversion processing onto image data. The image conversion unit 317 is composed of processing units 318 to 327 as shown hereinafter.

The expansion unit 318 expands received image data. The compression unit 319 compresses received image data. The rotation unit 320 rotates received image data. The variable power unit 321 executes resolution conversion processing (for example, from 600 dpi to 200 dpi) onto received image data. The color space conversion unit 322 converts color spaces of received image data. The color space conversion unit 322 is capable of executing publicly-known background removal processing, publicly-known LOG conversion processing (RGB→CMY), and publicly-known output color correction processing (CMY→CMYK) by use of a matrix or a table. The binary-to-multivalued conversion unit 323 converts received two-gradation image data into 256-gradation image data. In contrast thereto, the multivalued-to-binary conversion unit 324 converts received 256-gradation image data into two-gradation image data by a technique such as error diffusion processing.

The synthesis unit 327 synthesizes two received image data to generate one image data. Note that when the synthesis unit 327 synthesizes two image data, a method in which a mean value of luminance values provided to respective pixels of the objects to be synthesized is used as a synthesis luminance value, or a method in which a luminance value of pixels which is brighter in luminance level than the other one is used as a luminance value of pixels after synthesis is applied. Further, a method in which a luminance value of pixels which is darker in luminance level than the other one is used as a luminance value of pixels after synthesis may be used. Further, a method for determining a luminance value after synthesis by the logic operation OR, the logic operation AND, and the logic operation EXCLUSIVE OR for the pixels of the objects to be synthesized may be applied. These synthesis methods are all well-known techniques. The pixel skipping unit 326 skips pixels of received image data to perform resolution conversion, to generate ½, ¼, and ⅛ image data. The move unit 325 adds a margin portion to received image data or eliminates a margin portion from received image data.

An RIP 328 receives intermediate data generated on the basis of PDL code data transmitted from the PC 40, to generate bit-mapped (multivalued) data.

Figure 4:
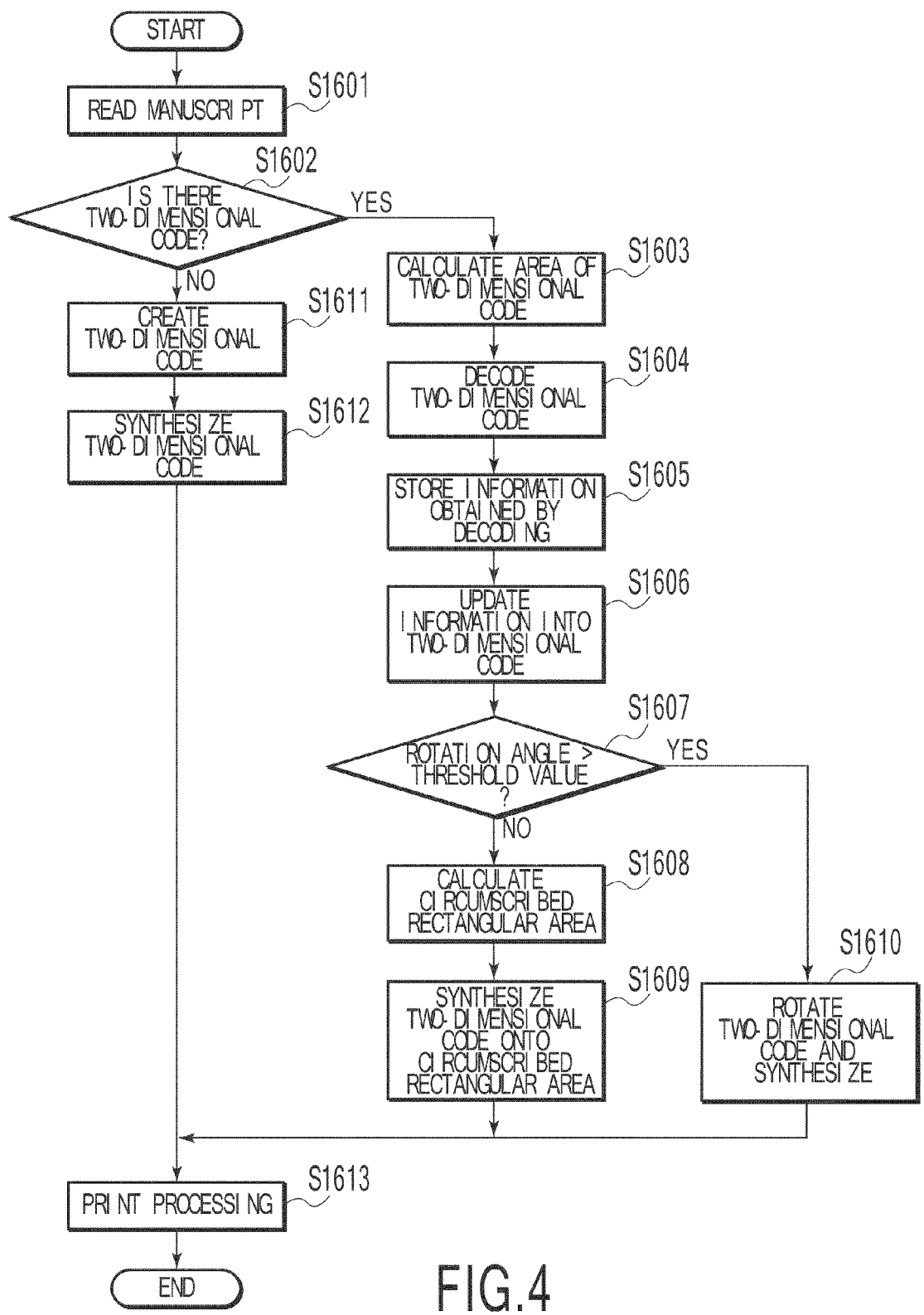
FIG. 4 is a flowchart of processings of a two-dimensional code.
Figure 5:
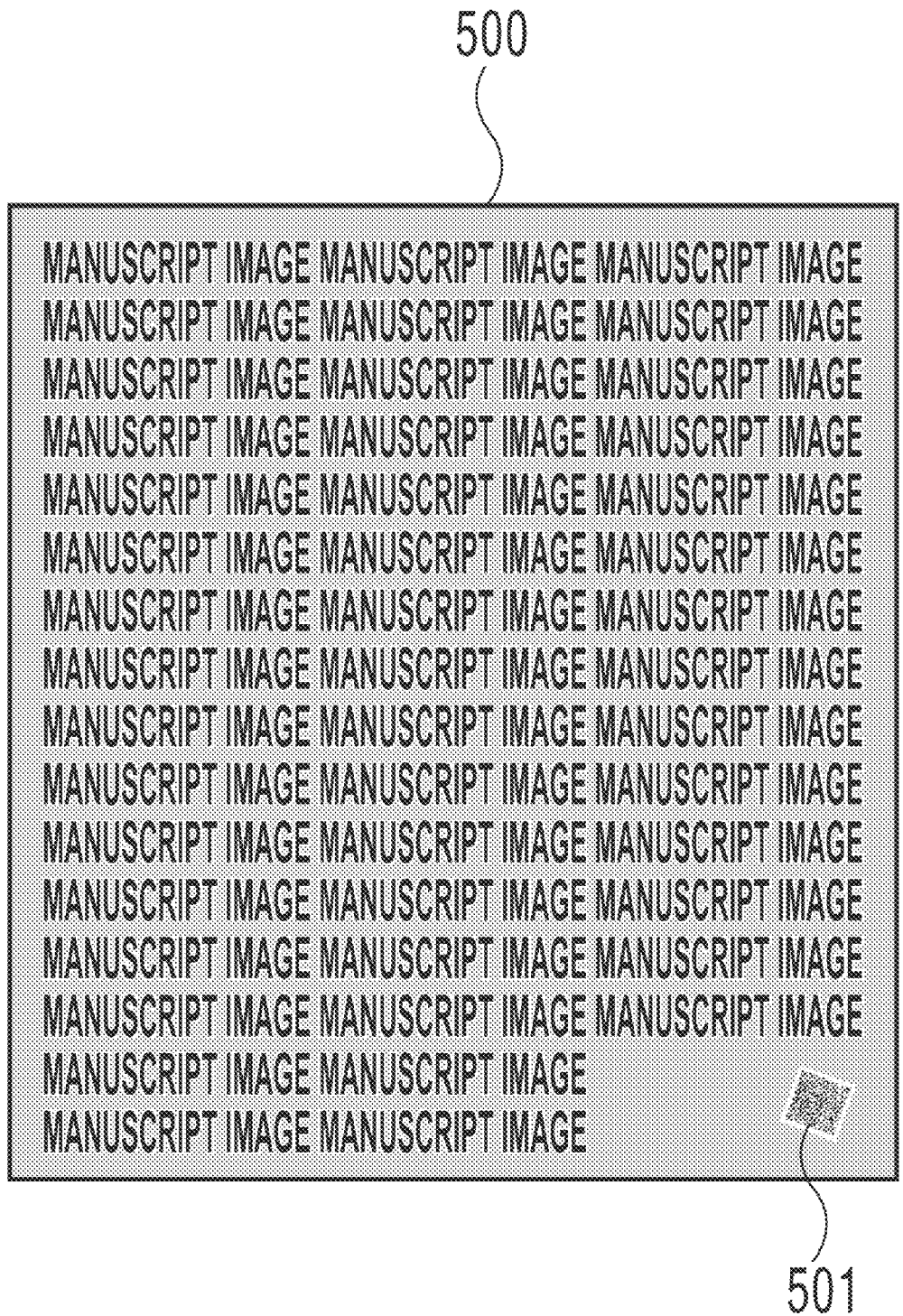
FIG. 5 is a view showing an image including a two-dimensional code.

FIG. 4 is a flowchart of processings of a two-dimensional code in the present embodiment. The processings will be described assuming that a two-dimensional code 501 in image data 500 as shown in FIG. 5 is used in the present embodiment. The two-dimensional code is a code in which information such as a character or a numeral is encoded as a graphic pattern.

First, in S1601, the CPU 301 compresses image data on a manuscript read via the scanner I/F 311 from the scanner unit by the compression unit 313, and stores the image data into the RAM 302.

Next, in S1602, the CPU 301 judges whether or not there is a two-dimensional code in the image data expanded by the expansion unit 318, to detect the two-dimensional code. As a method for detecting a two-dimensional code used in the present embodiment, a publicly-known method may be utilized. That is, the CPU 301 scans the image data and specifies three clipped symbols 502 in FIG. 6 (only the two-dimensional code 501 of FIG. 5 is enlarged), to be capable of detecting the two-dimensional code. Even if the clipped symbols 502 are scanned from any direction, a ratio of the black areas and the white areas is 1 (black):1 (white):3 (black):1 (white):1 (black).

When it is judged that there is a two-dimensional code in S1602, the processing proceeds to S1603. When it is judged that there is no two-dimensional code in S1602, the processing proceeds to S1611.

In S1603, the CPU 301 calculates an area of the two-dimensional code (an area 801 in FIG. 8) on the basis of the positions of the three clipped symbols, to store the position of the two-dimensional code into the RAM 302. Here, the area of the two-dimensional code (the area 801 in FIG. 8) includes a main body portion in which the clipped pattern and information are included, and the peripheral margin portion.

Further, in S1603, the CPU 301 calculates a rotation angle of the two-dimensional code to store the rotation angle into the RAM 302. Here, the aforementioned rotation angle means how many degrees the two-dimensional code detected (i.e., before update) is rotated in the clockwise direction from the orientation of the image data obtained in S1602 (i.e., the direction of scanning the manuscript read in S1601). Moreover, in S1603, the CPU 301 calculates vertical and horizontal lengths of the two-dimensional code to store the lengths into the RAM 302. Note that the vertical and horizontal lengths mean lengths of the respective sides of the two-dimensional code.

Next, in S1604, the CPU 301 decodes the two-dimensional code.

Next, in S1605, the CPU 301 stores information obtained by decoding the two-dimensional code in S1604, into the RAM 302. Note that the information obtained by decoding the two-dimensional code includes, for example, information on a user who has created the manuscript including the two-dimensional code, a created date and time (or reproduced date and time) of the manuscript including the two-dimensional code, and identification information on an image forming apparatus that has created the manuscript including the two-dimensional code.

Next, in S1606, the CPU 301 uses the information stored in the RAM 302 in S1605, to encode the information into a two-dimensional code, and stores the two-dimensional code into the RAM 302. That is, the CPU 301 uses the information stored in the RAM 302 in S1605, to create a new upright two-dimensional code, and stores the new upright two-dimensional code into the RAM 302. Thereby, the CPU 301 updates the information stored in the RAM 302 in S1605 to encode the information into the two-dimensional code, and stores the two-dimensional code into the RAM 302.

Figure 6:
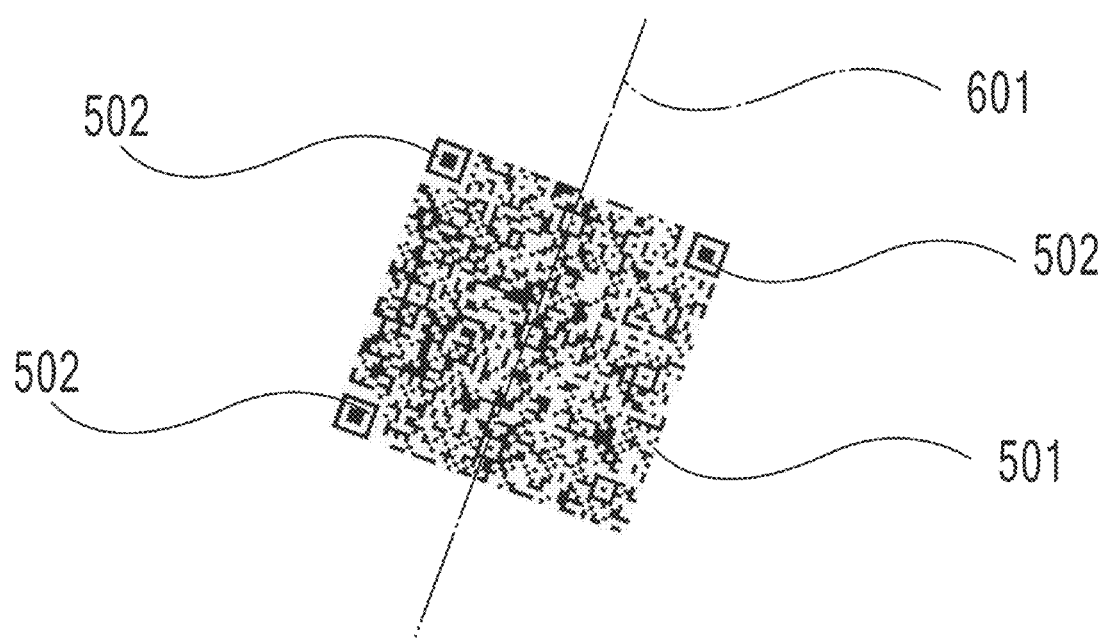
FIG. 6 is a view showing the enlarged two-dimensional code included in the image of FIG. 5.

Here, the term "upright" means that a midline 601 of the two-dimensional code shown in FIG. 6 is positioned in parallel with the orientation of the image data obtained in S1602 (i.e., the direction of scanning the manuscript read in S1601 (a main scanning direction or a vertical scanning direction)).

Note that the upright two-dimensional code created by the CPU 301 in S1606 is called a two-dimensional code after update. Further, as the processing in S1606, processing for creating a new upright two-dimensional code in place of the two-dimensional code detected in S1601 is called update of two-dimensional code.

Note that, in S1606, the CPU 301 does not encode the information stored in the RAM 302 directly, but may eliminate some of the information, add new information thereto, or update the information, and thereafter, the CPU 301 may encode the information.

For example, the following is given as an example of information to be changed. The user information in the two-dimensional code before update (information on a user who has created the manuscript, or information to specify a user uniquely) is changed to the user information input from the operating unit 12. The manuscript created date and time in the two-dimensional code before update is changed to the reproduced date and time. The identification information on the image forming apparatus in the two-dimensional code before update (identification information on the image forming apparatus that has created the manuscript) is changed to the identification information on the image forming apparatus that reproduces the manuscript.

Further, in a case in which there is a small amount of information which can be encoded into an upright two-dimensional code because of low resolution of the image forming apparatus, some of the information is eliminated. In this case, the information is eliminated in the order of low-priority information (example: manuscript created data and time).

Further, in a case in which there is information set to add in the image forming apparatus (for example, information on a management user who manages the image forming apparatus), such information is added.

Next, in S1607, the CPU 301 reads a rotation angle of the two-dimensional code before update out of the RAM 302. Further, the CPU 301 calculates a rotation angle threshold value (θ) which will be described later. Then, the CPU 301 judges whether or not the rotation angle of the two-dimensional code is greater than the rotation angle threshold value. When the rotation angle of the two-dimensional code is less than or equal to the rotation angle threshold value, the processing proceeds to S1608, and when the rotation angle of the two-dimensional code is greater than the rotation angle threshold value, the processing proceeds to S1610.

Figure 7:
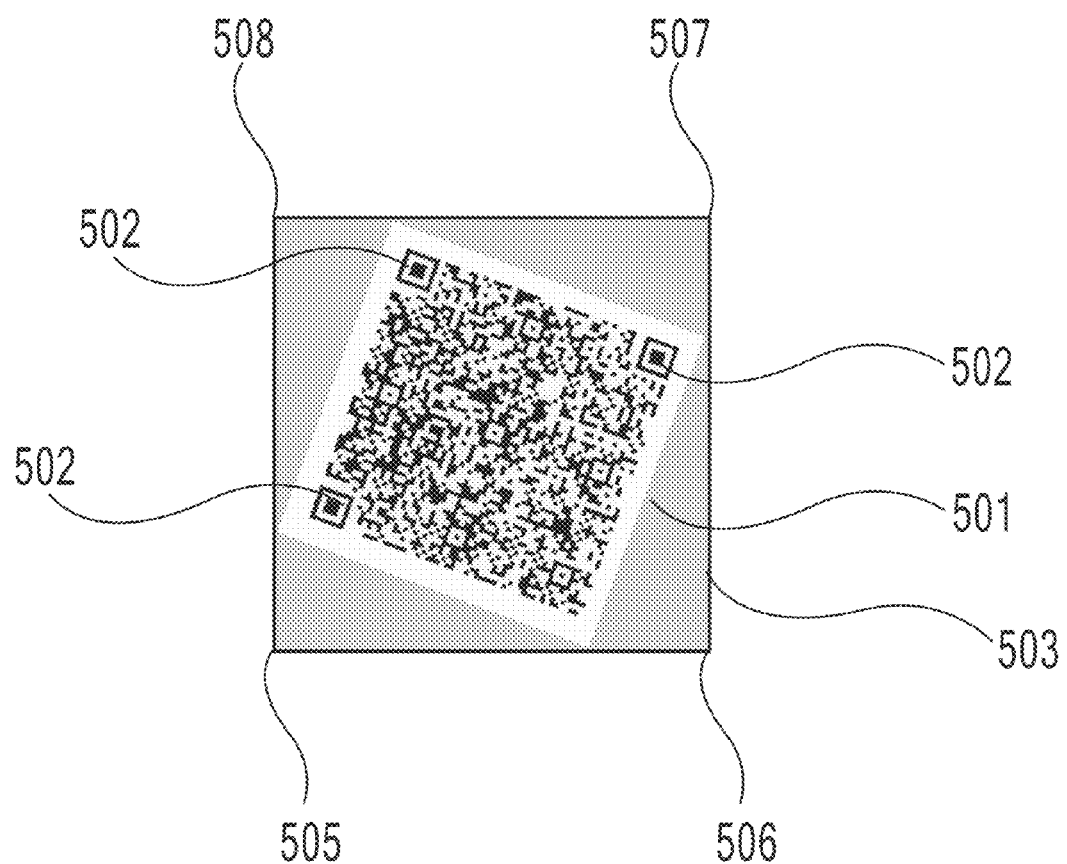
FIG. 7 is a view showing a circumscribed rectangular area of the two-dimensional code.

In S1608, the CPU 301 calculates coordinates of a circumscribed rectangular area 503 contacting the non-upright two-dimensional code as shown in FIG. 7 on the basis of the image data, and stores the coordinates into the RAM 302. Here, for example, the coordinates of the circumscribed rectangular area 503 may be calculated as coordinates of four points 505 to 508 of the circumscribed rectangular area 503.

Next, in S1609, the CPU 301 synthesizes the two-dimensional code updated in S1606 with respect to the circumscribed rectangular area 503 onto a printed image. The details of the synthesis in S1609 will be described later. Note that, in accordance with processing which is the same as S1609, it is possible to arrange an upright two-dimensional code in an area based on the coordinates of the circumscribed rectangular area calculated in S1608. Here, the term "an area based on the coordinates of the circumscribed rectangular area" includes an area broader by predetermined pixels (for example, one pixel) vertically and horizontally than the circumscribed rectangular area, and the circumscribed rectangular area itself.

Next, in S1609, the CPU 301 compresses the synthesized image data by the compression unit 319, and stores the compressed image data into the RAM 302.

Next, in S1610, the CPU 301 rotates the two-dimensional code updated in S1606 by the rotation angle read out of the RAM 302, and synthesizes the two-dimensional code onto the same coordinates as that of the two-dimensional code before update in the synthesis unit 327.

Here, the aforementioned rotation angle threshold value is set in advance to a rotation angle at which a length of one side of the circumscribed rectangular area is made shorter by a predetermined length (2 mm) than a length of one side of the area of the upright two-dimensional code after update. This is from the empirical estimation that there is almost no variation in the appearance even if the upright two-dimensional code after update is synthesized without rotating it if the rotation angle threshold value is set to a rotation angle at which a length of one side of the circumscribed rectangular area is made shorter by a length less than 2 mm. However, the value of 2 mm is a subjective value, and the value is not necessarily fixed to 2 mm.

In the present embodiment, given that a length of one side of the two-dimensional code before update is A mm (the two-dimensional code handled in the present embodiment is a square), a length of one side of the circumscribed rectangular area is $A \sin \theta + A \cos \theta$ mm. It is given that a length of one side of the two-dimensional code after update is A mm, and a predetermined length is Z mm. A rotation angle threshold value (θ) becomes a value satisfying $A(\sin \theta + \cos \theta - 1) \leq Z$. Note that, as described above, the CPU 301 stores the length of one side of the two-dimensional code in the RAM 302 in S1603. Further, a rotation angle threshold value θ is to be calculated in S1607 as described above.

In S1611, the CPU 301 newly creates an upright two-dimensional code. That is, the CPU 301 encodes the user information input from the operating unit 12, the reproduced date and time, and the identification information on the image forming apparatus which has reproduced the manuscript, and stores the two-dimensional code into the RAM 302.

In S1612, the CPU 301 synthesizes the two-dimensional code stored in the RAM 302 in S1611 onto the image data expanded by the expansion unit 318 by use of the synthesis unit 327. A synthesis position may be a fixed position such as a top right or a bottom left in the image data, or may be a position input from the operating unit 12. The CPU 301 compresses the synthesized image data by the compression unit 319, and stores the compressed image data into the RAM 302.

In S1613, the CPU 301 reads the image data onto which the two-dimensional code has been synthesized in S1609, S1610, or S1612 out of the RAM 302. Then, the CPU 301 transmits the image data expanded by the expansion unit 316 to the printer unit 14 via the printer image processing unit 315 and the printer I/F 314, and the image data is printed by the printer unit 14.

Next, the details of S1609 will be described hereinafter with reference to the drawings.

Figure 8:
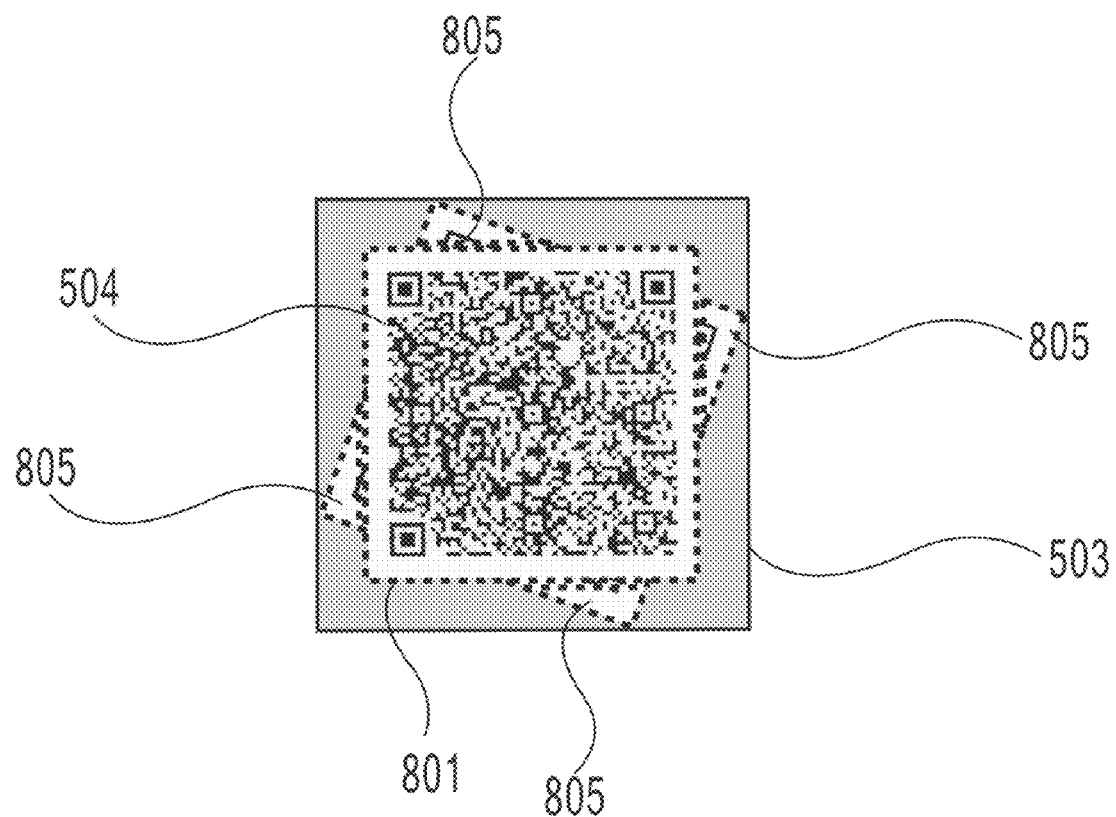
FIG. 8 is a view showing protruded areas of the two-dimensional code.

First, FIG. 8 shows the circumscribed rectangular area 503 when a two-dimensional code 504 after update is synthesized without rotating it onto the two-dimensional code 501 before update with a same center coordinate. The areas specified by four reference numerals 805 are parts of the two-dimensional code 501, that is not overwritten with the two-dimensional code 504. Hereinafter, the areas 805 are called protruded areas.

The protruded areas 805 are areas included in the two-dimensional code before update, and areas which are not included in the two-dimensional code after update. Then, as shown in FIG. 8, the protruded areas are included in the circumscribed rectangular area 503.

In S1609, the CPU 301 controls to prevent the four protruded areas 805 being printed on a sheet as is in the original manuscript to make a printed image look worse in appearance. In detail, the CPU 301 replaces the respective pixels in the circumscribed rectangular area including the protruded areas 805 by other colors. Thereby, the CPU 301 is capable of preventing the four protruded areas 805 from making a printed image look worse in appearance after printing.

Figure 9:
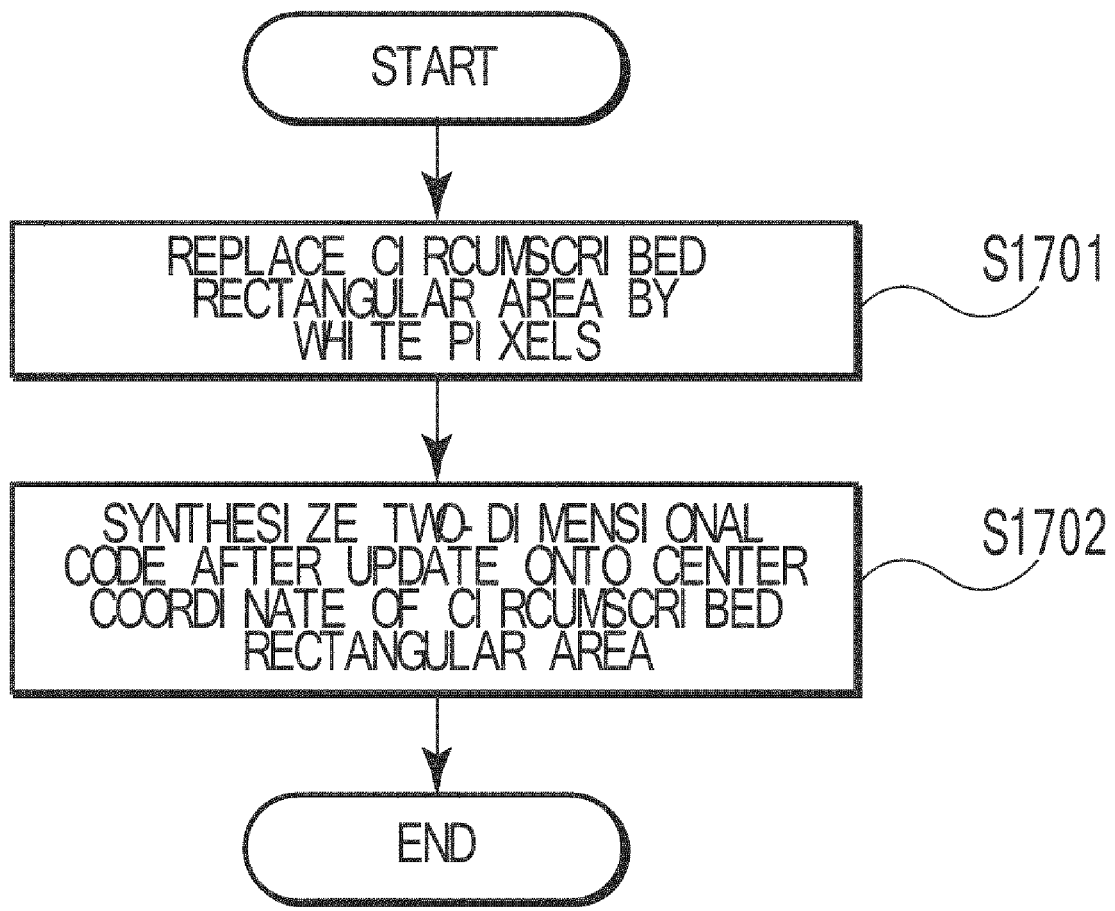
FIG. 9 is a flowchart of processings in S1609 in a first embodiment.

FIG. 9 is a view showing a flowchart of processings in S1609 in the first embodiment.

In S1701, the CPU 301 replaces all the pixels in the circumscribed rectangular area 503 by other color pixels (the present embodiment will be described assuming that the pixels are white pixels). This replacement eliminates the two-dimensional code before update existing in the circumscribed rectangular area 503.

Next, in S1702, the CPU 301 synthesizes the two-dimensional code 504 updated in S1606 so as to match the center coordinate of the two-dimensional code to the center coordinate of the circumscribed rectangular area 503 in the synthesis unit 327.

By the processing in S1609 (S1701 and S1702), some of or all the pixels in the circumscribed rectangular area of the two-dimensional code can be replaced by pixels different from corresponding pixels in the image data, and the two-dimensional code can be synthesized without rotating it onto the center coordinate of the circumscribed rectangular area of the two-dimensional code.

Figure 10:
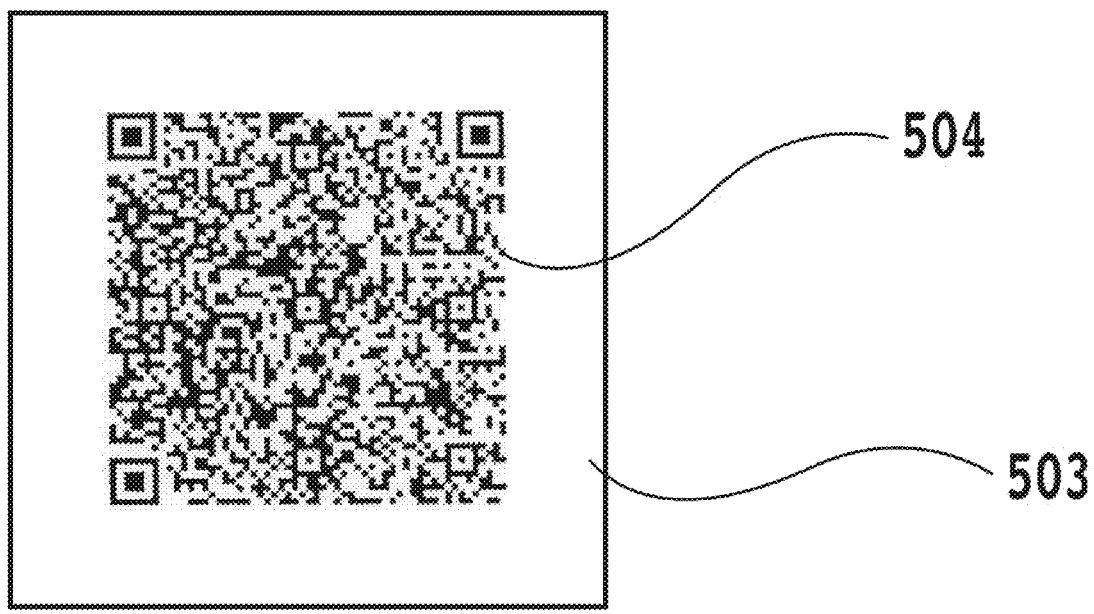
FIG. 10 is a view showing the inside of a circumscribed rectangular area of a two-dimensional code obtained as a result of processing in S1702 in the first embodiment.
Figure 11:
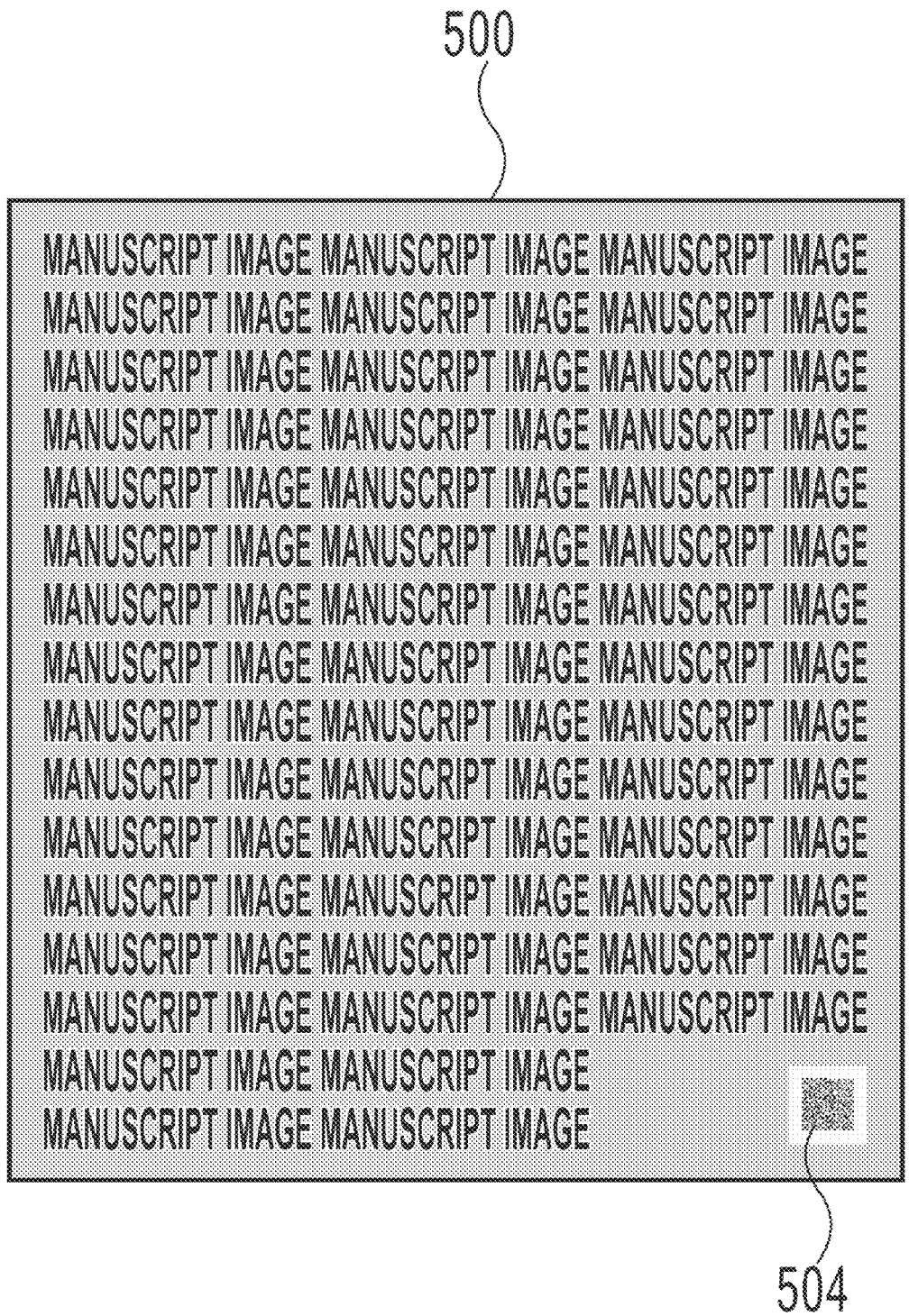
FIG. 11 is a view showing an image obtained as a result of the processing in S1702 in the first embodiment.

FIG. 10 (503) is a view showing the inside of a circumscribed rectangular area of the two-dimensional code obtained as a result of the processing in S1702, and FIG. 11 is a view showing the image obtained as a result of the processing in S1702. As shown in FIGS. 10 and 11, in accordance with the present embodiment, it is possible to eliminate the two-dimensional code 501 before update, which makes it possible to synthesize the two-dimensional code 504 after update so as not to make the image data look worse in appearance. Further, in accordance with the present embodiment, because the two-dimensional code after update is synthesized without rotating it, processing speed thereof can be improved.

Second Embodiment

There is a difference of two-dimensional code synthesis processing unit between a second embodiment and the first embodiment.

If all of the area other than the two-dimensional code in the circumscribed rectangular area is made to have white pixels as in the first embodiment, an area other than the two-dimensional code after update in the circumscribed rectangular area is greatly different in color from the peripheral area of the circumscribed rectangular area, which may disfigure the image data.

Then, in the present embodiment, processing for making colors of the peripheral area of the circumscribed rectangular area and the area other than the two-dimensional code after update in the circumscribed rectangular area similar to one another is executed.

In detail, an average color of "the area other than the two-dimensional code before update in the circumscribed rectangular area" in the original image data (the image data expanded in S1602) is determined, and the average color is used as a color of "the area other than the two-dimensional code after update in the circumscribed rectangular area."

Thereby, the color of the image data (the image data obtained in S1611) including the two-dimensional code after update and the color of the image data including the two-dimensional code before update are made similar overall.

Figure 12:
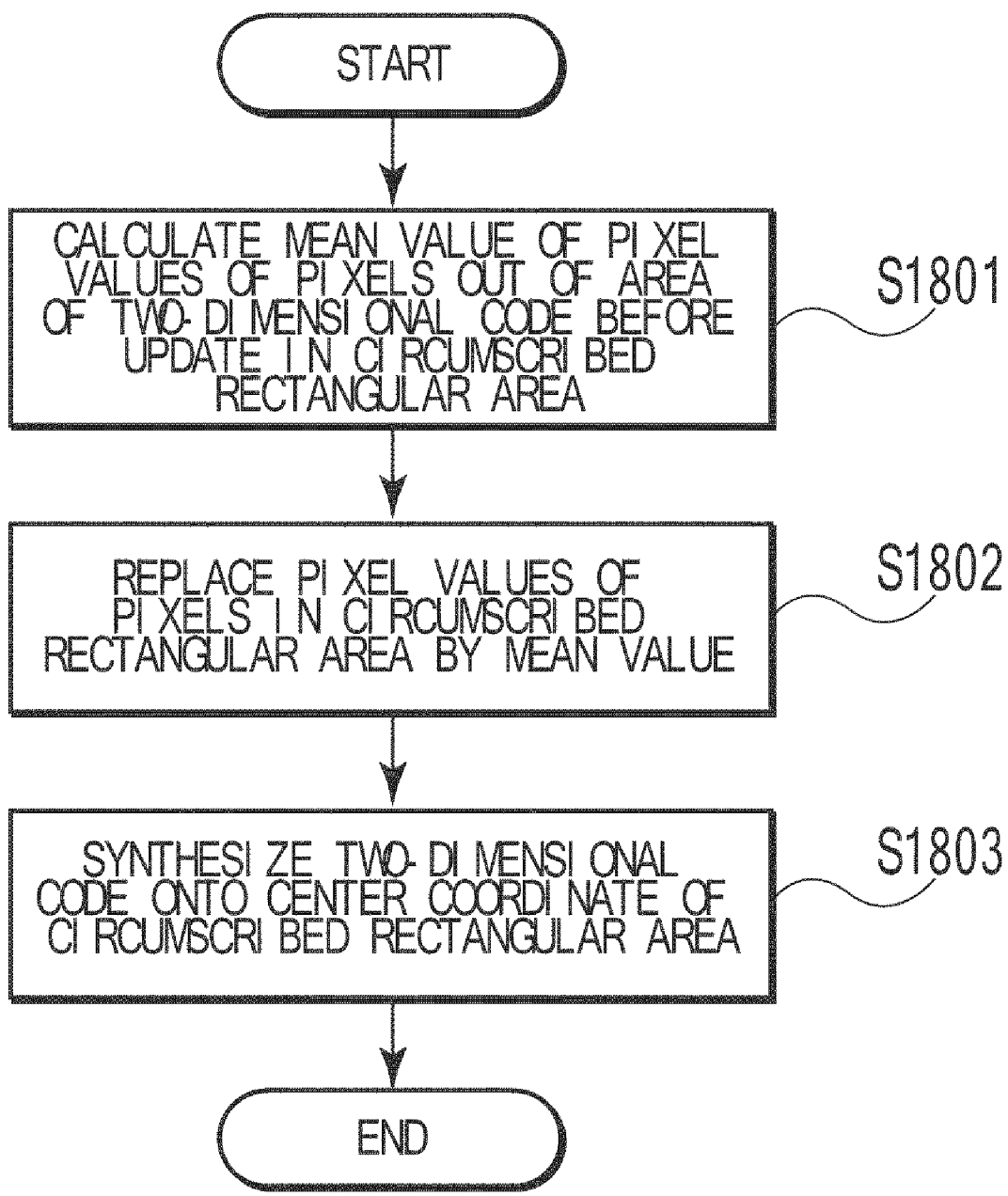
FIG. 12 is a flowchart of processings in S1609 in a second embodiment.

FIG. 12 is a view showing a flowchart of S1609 in the second embodiment.

In S1801, the CPU 301 calculates pixel values of the respective pixels in the area other than the non-upright two-dimensional code before update included in the circumscribed rectangular area 503, and a mean value of the pixel values of the respective pixels in the area other than the non-upright two-dimensional code before update.

Next, in S1802, the CPU 301 replaces the pixel values (example: luminance values) of the respective pixels in the circumscribed rectangular area 503 by the above-described mean value. This replacement eliminates the two-dimensional code before update existing in the circumscribed rectangular area 503. Note that, in S1802, the CPU 301 may replace the pixel values of the respective pixels in the area other than the upright two-dimensional code in the circumscribed rectangular area 503 by a predetermined value.

Next, in S1803, the CPU 301 synthesizes the two-dimensional code 504 updated in S1606 so as to match the center coordinate of the two-dimensional code to the center coordinate of the circumscribed rectangular area 503 in the synthesis unit 327.

Figure 13:
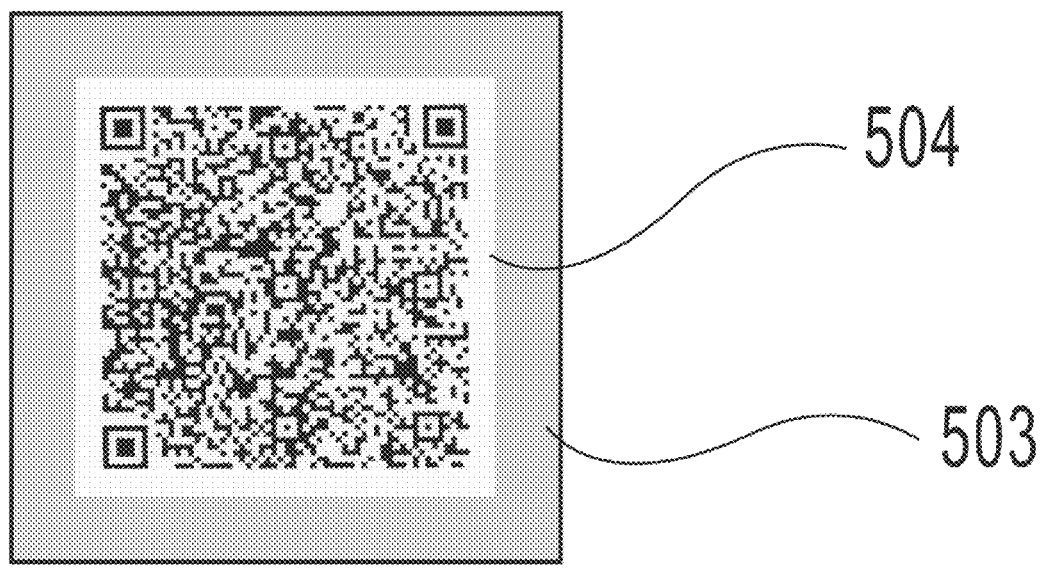
FIG. 13 is a view showing the inside of a circumscribed rectangular area of a two-dimensional code obtained as a result of processing in S1803 in the second embodiment.
Figure 14:
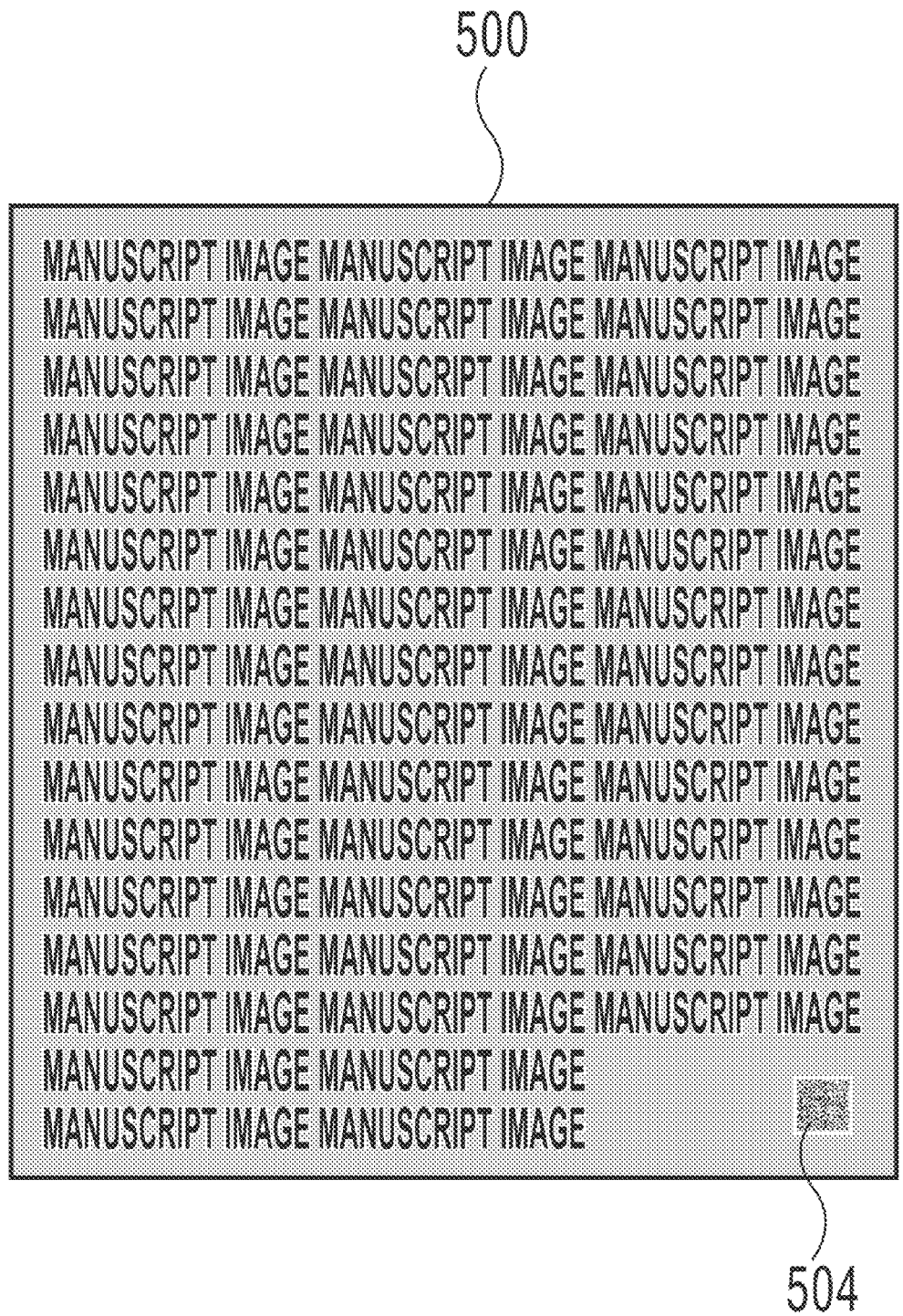
FIG. 14 is a view showing an image obtained as a result of the processing in S1803 in the second embodiment.

FIG. 13 is a view showing the inside of the circumscribed rectangular area of the two-dimensional code obtained as a result of the processing in S1803, and FIG. 14 is a view showing the image obtained as a result of the processing in S1803. As shown in FIGS. 13 and 14, in accordance with the present embodiment, it is possible to eliminate the two-dimensional code 501 before update, which makes it possible to synthesize the two-dimensional code 504 after update so as not to make the image data look worse in appearance. Further, in accordance with the present embodiment, as compared with the synthesis processing in S1609 in the first embodiment, it is possible to make the appearance of the area other than the two-dimensional code 504 in the circumscribed rectangular area more similar to the original image data. Further, in accordance with the present embodiment, because the two-dimensional code after update is synthesized without rotating it, processing speed thereof can be improved.

Further, in accordance with the present embodiment, it is possible to solve the problem that, in a case in which a two-dimensional code to be printed again is printed on a sheet without rotating it on the same coordinates as the two-dimensional code in a manuscript, a part of the two-dimensional code in the manuscript is printed on the sheet, which makes the manuscript look worse in appearance.

Third Embodiment

There is a difference of two-dimensional code synthesis processing unit between a third embodiment and the first and second embodiments.

In the second embodiment, an average color (a mean luminance value) of "the area other than the two-dimensional code before update in the circumscribed rectangular area" is determined, and the average color is used as a color of "the area other than the two-dimensional code after update in the circumscribed rectangular area." On the other hand, in the present embodiment, the processing is executed by, not focusing on the entire circumscribed rectangular area, but focusing on only the protruded areas. In detail, processing for making a color of the protruded areas similar to a color of areas near the protruded areas in the original image data (the image data expanded in S1602) is executed.

In detail, an average color of only "the areas corresponding to the protruded areas" in "the circumscribed rectangular area" in the original image data (the image data expanded in S1602) is determined, and the average color is used as a color of "the protruded areas."

Thereby, the color of the image data (the image data obtained in S1601) including the two-dimensional code after update and the color of the image data including the two-dimensional code before update are made more similar overall.

Figure 15:
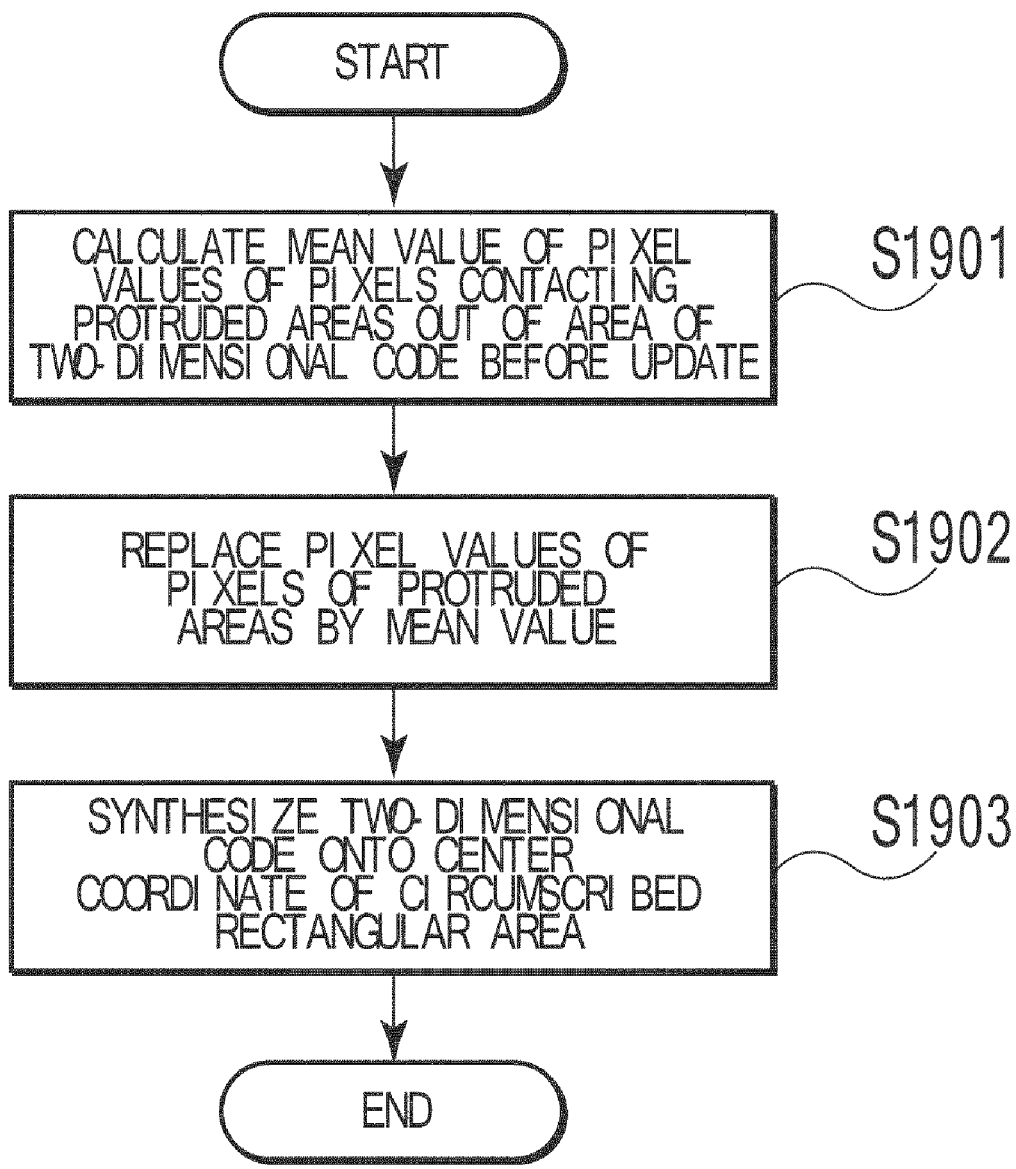
FIG. 15 is a flowchart of processings in S1609 in a third embodiment.

FIG. 15 is a view showing a flowchart of processings in S1609 in the third embodiment.

In S1901, the CPU 301 calculates a mean value of pixel values (example: luminance values) of all the pixels, which contact the protruded areas 504 and are out of the area of the two-dimensional code before update. The CPU 301 calculates the areas of the two-dimensional code 501 and the protruded areas 504 on the basis of the coordinates of the respective clipped symbols and its rotation angle. Then, the CPU 301 calculates the protruded areas as areas that are not overwritten with the areas of the two-dimensional code 504 after update in the area of the two-dimensional code 501 before update.

Next, in S1902, the CPU 301 replaces the pixel values of all the pixels in the protruded areas 504 by the mean value calculated in S1901. This replacement eliminates the two-dimensional code before update existing in the circumscribed rectangular area 503.

In the above-described way, in S1902, the pixels near the protruded areas are synthesized onto the protruded areas included in the circumscribed rectangular area (areas onto which the two-dimensional code after update is not synthesized in the two-dimensional code before update).

Next, in S1903, the CPU 301 synthesizes the two-dimensional code 504 updated in S1606 so as to match the center coordinate of the two-dimensional code to the center coordinate of the circumscribed rectangular area 503 in the synthesis unit 327.

Figure 16:
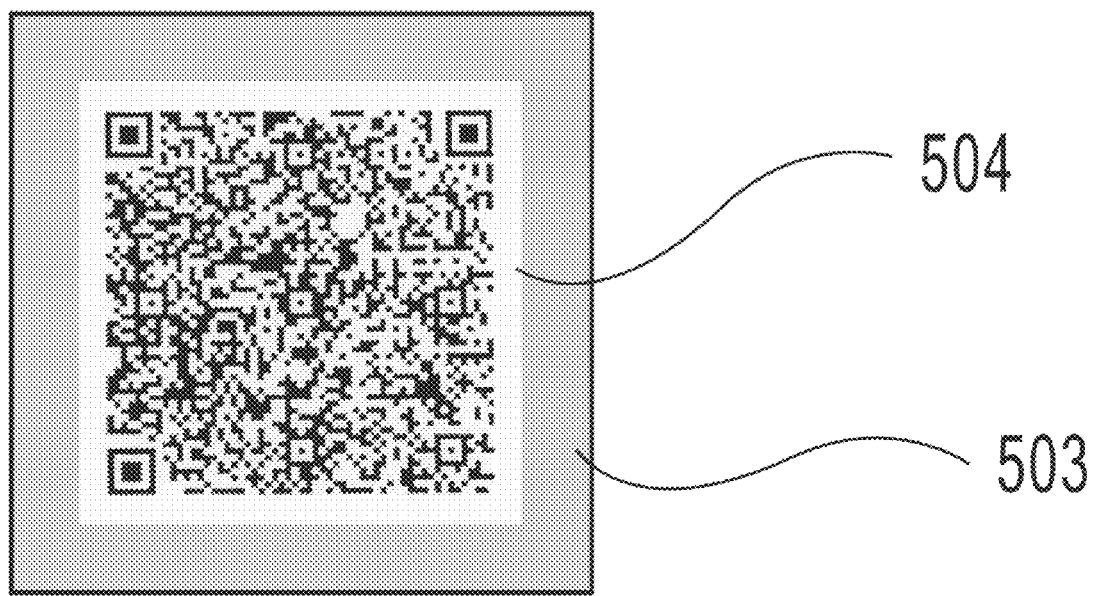
FIG. 16 is a view showing the inside of a circumscribed rectangular area of a two-dimensional code obtained as a result of processing in S1903 in the third embodiment.
Figure 17:
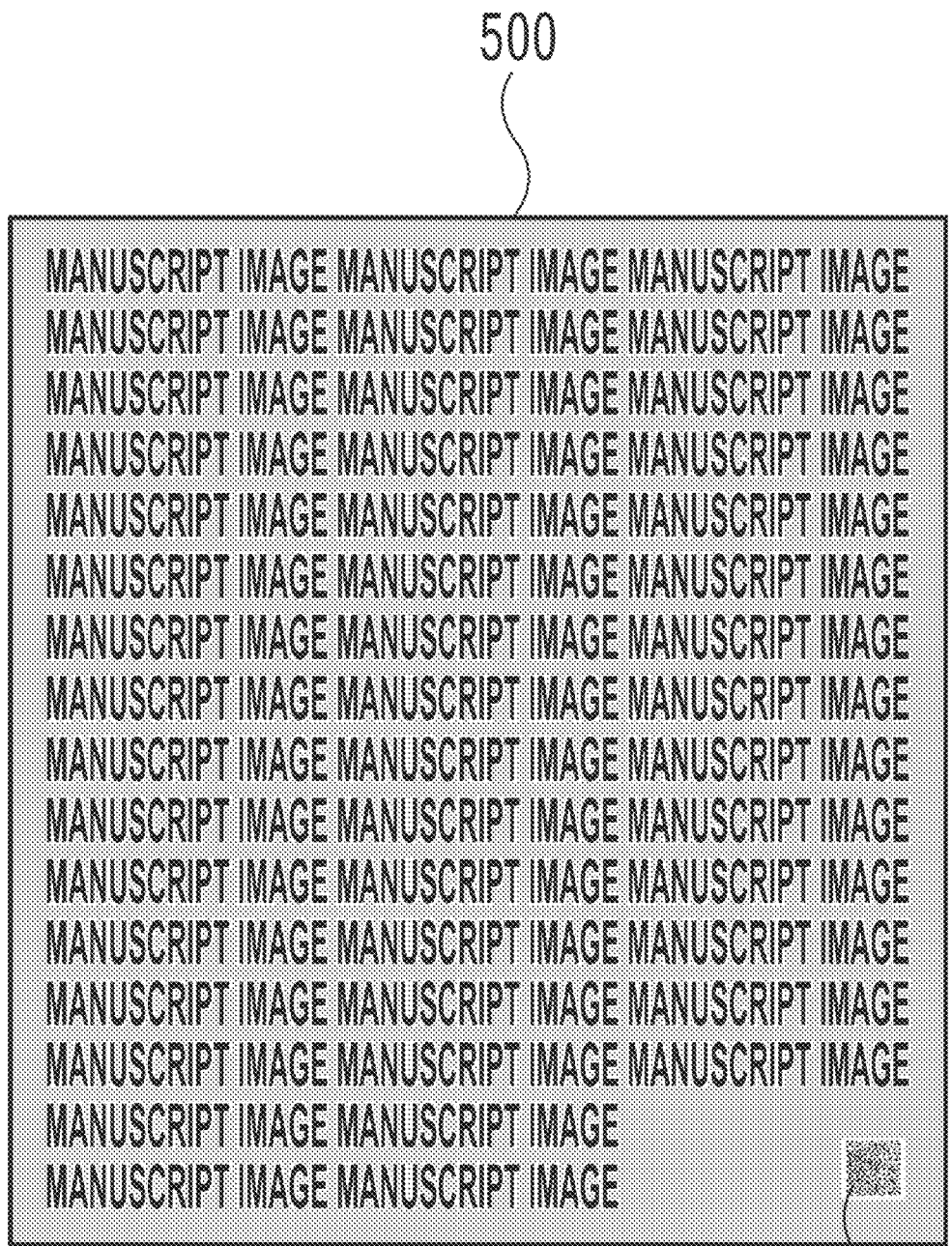
FIG. 17 is a view showing an image obtained as a result of the processing in S1903 in the third embodiment.

FIG. 16 is a view showing the inside of the circumscribed rectangular area of the two-dimensional code obtained as a result of the processing in S1903, and FIG. 17 is a view showing the image obtained as a result of the processing in S1903. As shown in FIGS. 16 and 17, it is possible to eliminate the two-dimensional code 501 before update, which makes it possible to synthesize the two-dimensional code 504 after update so as not to make the image data look worse in appearance. Further, in accordance with the present embodiment, as compared with the synthesis processing in S1609 in the first and second embodiments, because only the pixels in the protruded areas are replaced, it is possible to make the appearance of the area other than the two-dimensional code 504 in the circumscribed rectangular area more similar to the original image data. Further, in accordance with the present embodiment, because the two-dimensional code after update is synthesized without rotating it, processing speed thereof can be improved.

Note that, in the present invention, in order to distinguish among a plurality of two-dimensional codes, those may be called the "first two-dimensional code" and the "second two-dimensional code."

In the first to third embodiments, the image forming apparatus 10 has the CPU 301, the ROM 303, the RAM 302, and the HDD 304. Then, for example, the CPU 301 reads out a program stored in the HDD 304 to the RAM 302, to execute it, which realizes the processings in the first to third embodiments.

Other Embodiments

The object of the present invention can also be achieved such that a computer reads out the program code to execute it from a storage medium on which a program code for realizing the procedure of the processings is shown in the above-described embodiments. In this case, the program code itself read out of the storage medium realizes the functions in the above-described embodiments. Therefore, the program code and the storage medium on which the program code is stored as well can be configured as the present invention.

As the storage medium to supply the program code, for example, a floppy (registered trademark) disk, a hard disk, an optical disk, a magnetic optical disk, a CD-ROM, a CD-R, a magnetic tape, a nonvolatile memory card, a ROM, or the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-185112, filed Jul. 16, 2008, which is hereby incorporated by reference herein in its entirety.

What is claimed is:

1. An image forming apparatus comprising:
a decoding unit operable to decode a first two-dimensional code serving as a non-upright two-dimensional code in a manuscript image;
a synthesis unit operable to create a second two-dimensional code serving as an upright two-dimensional code by using information obtained by the decoding unit, to synthesize the second two-dimensional code onto the printed image data; and
a calculating unit operable to calculate a rotation angle of the first two-dimensional code,
wherein the synthesis unit determines whether the rotation angle of the first two-dimensional code is greater than a rotation angle threshold value ($\theta$) determined by a threshold length Z, and, if the rotation angle of the first two-dimensional code is greater than the rotation angle threshold value ($\theta$), the synthesis unit synthesizes the second two-dimensional code onto the printed image data by rotating the second two-dimensional code by the rotation angle of the first two-dimensional code, and, if the rotation angle of the first two-dimensional code is less than or equal to the rotation angle threshold value ($\theta$), the synthesis unit synthesizes the second two-dimensional code onto the printed image data without rotating the second two-dimensional code, and
wherein the rotation angle threshold value ($\theta$) satisfies an equation:

$$A(\sin\theta + \cos\theta - 1) \leq Z,$$

A being a length of one side of the first two-dimensional code in millimeters and the threshold length Z being in millimeters.

2. The image forming apparatus according to claim 1, wherein, if the second two-dimensional code is synthesized onto the printed image data, the synthesis unit is operable to calculate a circumscribed rectangular area of the first two-dimensional code, and to synthesize the second two-dimensional code in an upright state inside the calculated circumscribed rectangular area.

3. The image forming apparatus according to claim 2, wherein, if the second two-dimensional code is synthesized in an upright state onto the printed image data, the synthesis unit is operable to change a color of pixels in the circumscribed rectangular area of the first two-dimensional code.

4. The image forming apparatus according to claim 1, wherein, if the second two-dimensional code is synthesized onto the printed image data, the synthesis unit is operable to calculate an area based on a circumscribed rectangular area of the first two-dimensional code, and to synthesize the second two-dimensional code inside the calculated area based on the circumscribed rectangular area of the first two-dimensional code.

5. The image forming apparatus according to claim 4, wherein, if the second two-dimensional code is synthesized onto the printed image data, the synthesis unit is operable to change a color of pixels in the area based on the circumscribed rectangular area of the first two-dimensional code.

6. An image forming method comprising:
decoding a first two-dimensional code serving as a non-upright two-dimensional code in a manuscript image;
creating a second two-dimensional code serving as an upright two-dimensional code by using information obtained by the decoding, to synthesize the second two-dimensional code onto printed image data;
calculating a rotation angle of the first two-dimensional code; and
determining whether the rotation angle of the first two-dimensional code is greater than a rotation angle threshold value ($\theta$) determined by a threshold length Z;
wherein, if the rotation angle of the first two-dimensional code is determined to be greater than the rotation angle threshold value ($\theta$), the second two-dimensional code is synthesized onto the printed image data by rotating the second two-dimensional code by the rotation angle of the first two-dimensional code, wherein, if the rotation angle of the first two-dimensional code is determined to be less than or equal to the rotation angle threshold value (θ), the second two-dimensional code is synthesized onto the printed image data without rotating the second two-dimensional code, and wherein the rotation angle threshold value (θ) satisfies an equation:

$$A(\sin θ + \cos θ - 1) \leq Z,$$

A being a length of one side of the first two-dimensional code in millimeters and the threshold length Z being in millimeters.

7. The image forming method according to claim 6, wherein, if the second two-dimensional code is synthesized onto the printed image data, a circumscribed rectangular area of the first two-dimensional code is calculated, and the second two-dimensional code is synthesized in an upright state inside the calculated circumscribed rectangular area.

8. The image forming method according to claim 7, wherein, if the second two-dimensional code is synthesized in an upright state onto the printed image data, a color of pixels in the circumscribed rectangular area of the first two-dimensional code is changed.

9. The image forming method according to claim 6, wherein, if the second two-dimensional code is synthesized onto the printed image data, an area based on a circumscribed rectangular area of the first two-dimensional code is calculated, and the second two-dimensional code is synthesized inside the calculated area based on the circumscribed rectangular area of the first two-dimensional code.

10. The image forming method according to claim 9, wherein, if the second two-dimensional code is synthesized onto the printed image data, a color of pixels in an area based on the circumscribed rectangular area of the first two-dimensional code is changed.

11. A computer-readable storage medium storing a computer-executable program that, when executed by a computer processor, causes the computer processor to perform an image forming method, the method comprising:

decoding a first two-dimensional code serving as a non-upright two-dimensional code in a manuscript image;

creating a second two-dimensional code serving as an upright two-dimensional code by using information obtained by the decoding, to synthesize the second two-dimensional code onto printed image data; and calculating a rotation angle of the first two-dimensional code; and determining whether the rotation angle of the first two-dimensional code is greater than a rotation angle threshold value (θ) determined by a threshold length Z;

wherein, if the rotation angle of the first two-dimensional code is determined to be greater than the rotation angle threshold value (θ), the second two-dimensional code is synthesized onto the printed image data by rotating the second two-dimensional code by the rotation angle of the first two-dimensional code, wherein, if the rotation angle of the first two-dimensional code is determined to be less than or equal to the rotation angle threshold value (θ), the second two-dimensional code is synthesized onto the printed image data without rotating the second two-dimensional code, and wherein the rotation angle threshold value (θ) satisfies an equation:

$$A(\sin θ + \cos θ - 1) \leq Z,$$

A being a length of one side of the first two-dimensional code in millimeters and the threshold length Z being in millimeters.

12. The image forming apparatus according to claim 1, wherein the printed image data is image data obtained by eliminating the first two-dimensional code from the manuscript image.

13. The image forming method according to claim 6, wherein the printed image data is image data obtained by eliminating the first two-dimensional code from the manuscript image.

* * * * *